US011992827B2

(12) United States Patent
Li et al.

(10) Patent No.: US 11,992,827 B2
(45) Date of Patent: May 28, 2024

(54) MSECT-4 MOLECULAR SIEVES WITH OFF AND ERI TOPOLOGIES, PREPARATION METHOD THEREFOR, AND APPLICATIONS THEREOF (71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhenguo Li, Tianjin (CN); Kaixiang Li, Tianjin (CN); Zhixin Wu, Tianjin (CN); Xiaoning Ren, Tianjin (CN); Jianhai Wang, Tianjin (CN); Yuankai Shao, Tianjin (CN); Hanming Wu, Tianjin (CN); Li Zhang, Tianjin (CN); Cheng Lv, Tianjin (CN); Lingfeng Jia, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 18/337,068

(22) Filed: Jun. 19, 2023

(65) Prior Publication Data
US 2023/0330649 A1 Oct. 19, 2023

Related U.S. Application Data (63) Continuation of application No. PCT/CN2022/113798, filed on Aug. 21, 2022.

(30) Foreign Application Priority Data

Apr. 13, 2022 (CN) .......................... 202210381426.0

(51) Int. Cl.
*B01J 29/80* (2006.01)
*B01D 53/86* (2006.01)
(Continued)

(52) U.S. Cl.
CPC .......... *B01J 29/80* (2013.01); *B01D 53/8628* (2013.01); *B01J 29/54* (2013.01); *B01J 29/56* (2013.01); *B01J 29/58* (2013.01); *B01J 35/394* (2024.01); *B01J 37/0018* (2013.01); *B01J 37/009* (2013.01); *B01J 37/0236* (2013.01); *B01J 37/031* (2013.01); *B01J 37/04* (2013.01); *B01J 37/06* (2013.01); *B01J 37/08* (2013.01); *B01J 37/30* (2013.01); *B01D 2251/2062* (2013.01); *B01D 2255/1021* (2013.01); *B01D 2255/1023* (2013.01); *B01D 2255/1025* (2013.01); *B01D 2255/1026* (2013.01); *B01D 2255/104* (2013.01); *B01D 2255/106* (2013.01); *B01D 2255/2061* (2013.01); *B01D 2255/2063* (2013.01); *B01D 2255/2065* (2013.01); *B01D 2255/2066* (2013.01);
(Continued)

(58) Field of Classification Search
CPC ... B01J 29/80; B01J 29/54; B01J 29/56; B01J 29/58; B01J 35/394; B01J 37/0018; B01J 37/009; B01J 37/0236; B01J 37/031; B01J 37/04; B01J 37/06; B01J 37/08; B01J 37/30; B01J 2029/062; B01J 2229/186; B01J 2229/38; B01D 53/8628; B01D 2251/2062
See application file for complete search history.

(56) References Cited

U.S. PATENT DOCUMENTS

| 2,950,952 | A | 8/1960 | Breck et al. |
| 4,086,186 | A | 4/1978 | Rubin et al. |
| 10,221,073 | B2 * | 3/2019 | Xie .................. C01B 39/026 |

FOREIGN PATENT DOCUMENTS

| CN | 101962193 A | 2/2011 |
| CN | 112158857 A | 1/2021 |
| CN | 114455604 A | 5/2022 |

OTHER PUBLICATIONS

Internation Search Report of PCT/CN2022/113798, dated Jan. 17, 2023.

* cited by examiner

*Primary Examiner* — Yong L Chu
(74) *Attorney, Agent, or Firm* — True Shepherd LLC; Andrew C. Cheng (57) ABSTRACT

The present disclosure provides msect-4 molecular sieves with OFF and ERI topologies, a preparation method therefor, and applications thereof. An eight-membered ring small pore molecular sieve used as a raw material is dispersed in an aqueous phase. Following that, caustic potash, an aluminum source, and an organic structure-directing agent (OSDA) are added. The pH value is then adjusted to be greater than 10, and a silicon source is introduced to attain the desired silicon-aluminum ratio, followed by stirring reaction, aging, crystallization, filtration, washing, ammonia exchange reaction, drying, and calcination. The msect-4 molecular sieves with OFF and ERI topologies, the preparation method therefor, and applications exhibit excellent hydrothermal stability, a plurality of adsorption sites exposed by a regular bone-like structure, and a large specific surface area. Consequently, this molecular sieves find applicability across various technical fields including selective catalytic reduction, passive adsorption, and catalytic cracking, and has broad application prospects.

5 Claims, 10 Drawing Sheets (51) Int. Cl.
  *B01J 29/06* (2006.01)
  *B01J 29/54* (2006.01)
  *B01J 29/56* (2006.01)
  *B01J 29/58* (2006.01)
  *B01J 35/00* (2006.01)
  *B01J 35/30* (2024.01)
  *B01J 37/00* (2006.01)
  *B01J 37/02* (2006.01)
  *B01J 37/03* (2006.01)
  *B01J 37/04* (2006.01)
  *B01J 37/06* (2006.01)
  *B01J 37/08* (2006.01)
  *B01J 37/30* (2006.01)

(52) U.S. Cl.
  CPC ............... *B01D 2255/2068* (2013.01); *B01D 2255/20723* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20784* (2013.01); *B01D 2255/50* (2013.01); *B01D 2257/404* (2013.01); *B01J 2029/062* (2013.01); *B01J 2229/186* (2013.01); *B01J 2229/38* (2013.01)

| Compound | Wt% | Est.Error | Element | Wt% | Est.Error |
|---|---|---|---|---|---|
| $SiO_2$ | 78.03 | 0.21 | Si | 36.48 | 0.10 |
| $Al_2O_3$ | 16.12 | 0.18 | Al | 8.53 | 0.10 |
| CuO | 4.09 | 0.10 | Cu | 3.26 | 0.08 |
| $K_2O$ | 1.53 | 0.06 | K | 1.27 | 0.05 |
| MgO | 0.166 | 0.0083 | Mg | 0.1000 | 0.0050 |
| $TiO_2$ | 0.0164 | 0.0021 | Ti | 0.0098 | 0.0013 |
| $PtO_2$ | 0.0119 | 0.0050 | Pt | 0.0102 | 0.0043 |
| P | 0.0098 | 0.0035 | P | 0.0098 | 0.0035 |
| $La_2O_3$ | 0.0089 | 0.0038 | La | 0.0076 | 0.0033 |
| $Ga_2O_3$ | 0.0067 | 0.0023 | Ga | 0.0050 | 0.0017 |
| $Fe_2O_3$ | 0.0064 | 0.0022 | Fe | 0.0045 | 0.0015 |
| $MoO_3$ | 0.0054 | 0.0026 | Mo | 0.0036 | 0.0017 |

Sum Weight% before normalization to 100%=23.4%
Total Weight% Oxygen=50.31

FIG. 10

MSECT-4 MOLECULAR SIEVES WITH OFF AND ERI TOPOLOGIES, PREPARATION METHOD THEREFOR, AND APPLICATIONS THEREOF

CROSS-REFERENCE TO RELATED APPLICATIONS

This application is a continuation of International Patent Application No. PCT/CN2022/113798 with a filing date of Aug. 21, 2022, designating the United States, now pending, and further claims priority to Chinese Patent Application No. 202210381426.0 with a filing date of Apr. 13, 2022. The content of the aforementioned applications, including any intervening amendments thereto, are incorporated herein by reference.

TECHNICAL FIELD

The present disclosure belongs to the field of molecular sieve synthesis, in particular to msect-4 molecular sieves with OFF and ERI topologies, a preparation method therefor, and applications thereof.

DESCRIPTION OF RELATED ART

In 2020, national emissions of nitrogen oxides ($NO_x$) from motor vehicles reached 6.263 million tons, with diesel trucks being main contributors. In addition, the impact of non-road mobile source emissions on air quality cannot be ignored, with $NO_x$ emissions reaching 4.782 million tons, close to that of motor vehicles. Selective catalytic reduction (SCR) technology is the most effective $NO_x$ removal technology. With the comprehensive implementation of China VI regulations for heavy-duty vehicles, core catalysts of $NH_3$-SCR (ammonia selective catalytic reduction) technology have changed from conventional vanadium-tungsten-titanium catalysts to molecular sieve catalysts. Eight-membered ring small pore molecular sieves are mainstream carrier materials for SCR catalysts in the China Stage VI, with common framework types including CHA, BEA, LTA, AFX, and the like. Patent CN109999895B discloses molecular sieves suitable for $NH_3$-SCR technology, including β-zeolite, ZSM-5, ferrierite, SAPO-34, and SSZ-13; Patent CN112495429B discloses SCR catalysts comprising molecular sieves with CHA framework type; and Patent CN104128200B discloses molecular sieves with BEA, MFI, CHA, AEI, FAU, LTA, and AFX topologies.

Most of the SCR catalyst carriers in the foregoing patents are molecular sieves with one or more framework types. The mixed form utilizes the complementary effect of molecular sieve catalysts with different framework types to enhance catalytic activity and durability of the catalysts. However, this technological approach generally has the drawbacks of irregular product morphology, uncontrollable proportion of two crystalline phases, poor product consistency, and the like caused by independent existence and separate growth of two crystals, and ultimately cannot achieve eutectic at the level of the molecular framework. According to the present disclosure, regular, bone-like, and highly exposed msect-4 molecular sieves with OFF and intergrown topologies are synthesized in a suitable alkaline environment within an extremely short time based on the similarity of ERI and OFF framework topologies, and the msect-4 molecular sieve is suitable for the fields of selective catalytic reduction technology (Urea-SCR), passive nitrogen oxide adsorption technology (PNA), methanol-to-olefin technology (MTO), and fluid catalytic cracking technology (FCC).

SUMMARY OF PRESENT DISCLOSURE

Bone-like msect-4 molecular sieves with OFF and ERI topologies and highly regular morphology are synthesized according to the present disclosure, and a corresponding rapid synthesis method is provided, to solve the following three technical problems: lengthy synthesis cycle in conventional methods; limited low-temperature performance and narrow temperature window of commercial molecular sieve catalysts in De-$NO_x$ technology; and high prices of commercial SCR catalyst molecular sieves at present.

Msect-4 molecular sieves with OFF and ERI topologies and a preparation method therefor are provided in the present disclosure. According to the disclosure, N, N, N-trimethylamantadine, benzyltrimethylammonium, choline chloride, 1,6-hexanediamine, tetramethylammonium hydroxide, tetraethylammonium hydroxide, tetrapropylammonium hydroxide, and N, N-dimethylpiperidine hydroxide are selected as structure-directing agents, and the intergrown molecular sieves can be generated by hydrothermal crystallization for only 6 h in a suitable alkaline environment (pH>10). Copper-based catalysts prepared by using the molecular sieves as carriers have excellent low-temperature $NH_3$-SCR activity and a wide temperature window.

Processes for preparing the msect-4 molecular sieves with intergrown phases of OFF and ERI topologies involved in the present disclosure are as follows:

(1) dispersing an eight-membered ring small pore molecular sieve used as a raw material in an aqueous phase with stirring, adding caustic potash, adjusting pH to be greater than 10, adding an Organic Structure-Directing Agent (OSDA), and adding a silicon source to adjust a silicon-aluminum ratio, and a proportion of raw materials is $Al_2O_3$:$SiO_2$:OSDA:$K_2O$:$H_2O$=1:(0.1-500):(0.01-100):(0.02-40):(10-1000);

(2) performing continuous stirring reaction for 1 h-2 h to form a milky white precursor for sol-gel, and putting the precursor aside to age for 12 h; subsequently, transferring the precursor to a hydrothermal synthesis reactor, and carrying out a hydrothermal reaction at a constant temperature selected from a range of 140° C.-220° C. for 6 h-240 h; after the reaction is completed, performing solid-liquid separation on the product, washing filter cakes completely, drying until the water content is less than 6 wt. %, and calcination at a temperature selected from a range of 450° C.-550° C. for 3 h-9 h to obtain potassium-type msect-4 (K-msect-4); and (3) performing an ammonium exchange until the alkali metal (K, Na) content is less than 1000 ppm, and obtaining hydrogen-type msect-4 (H-msect-4) after drying and calcination.

A second synthesis method without using a structure-directing agent includes the following steps:

(1) adding an aluminum source, a silicon source, and caustic alkali into deionized water sequentially in a stoichiometric ratio of $Al_2O_3$:$SiO_2$:$K_2O$:$H_2O$=1:(0.1-500):(0.01-100):(10-1000), and dissolving completely with stirring; performing stirring reaction continuously for 1 h-2 h to form a milky white precursor for sol-gel, and putting the precursor aside to age for 12 h; subsequently, transferring the precursor to a hydrothermal synthesis reactor, and performing a hydrothermal reaction at a constant temperature selected from a range of 160° C.-220° C. for 6 h-240 h; after the reaction is completed, performing solid-liquid separation on the product, washing filter cakes completely, drying until the water content is less than 6 wt %, and calcination at a temperature selected from a range of 450° C.-550° C. for 3 h-9 h to obtain K-type msect-4 (K-msect-4); and (2) performing an ammonium exchange until the alkali metal (K, Na) content is less than 1000 ppm, and obtaining hydrogen-type msect-4 (H-msect-4) after drying and calcination.

The raw materials used in the foregoing processes include an aluminum source, a silicon source, an OSDA, caustic potash, and deionized water sequentially, with a molar ratio of $Al_2O_3:SiO_2:OSDA:K_2O:H_2O=1:(0.1-500):(0.01-100):(0.02-40):(10-1000)$, preferably $1:(5-50):(1-10):(0.5-10):(60-200)$.

The silicon source used in the foregoing two synthesis methods specifically includes one or more of sodium silicate, silica sol, fumed silica, coal gangue, metasilicic acid, potassium silicate, white carbon black, and ethyl orthosilicate.

The aluminum source used in the foregoing synthesis method specifically includes one or more of an eight-membered ring small pore molecular sieve, aluminum nitrate, aluminum sulfate, aluminum chloride, aluminum hydroxide, sodium metaaluminate, pseudo-boehmite, and aluminum isopropoxide; and the eight-membered ring small pore molecular sieve specifically includes one or more molecular sieves having an AEI, AFX, CHA, DDR, EEI, ESV, ERI, LEV, LTN, LTA, KFI, RHO, RTH, SAS, or SFW topology.

The caustic potash is used in the foregoing synthesis methods to adjust the pH value and create a suitable alkaline solution environment for the msect-4 molecular sieves, and to promote rapid formation of a crystal framework type of molecular sieves by using the potassium and shorten synthesis time.

Methods for shortening the synthesis time also include adding seed crystals which specifically includes at least one molecular sieve having a CHA, ERI, or OFF topology.

Methods for promoting crystal growth in the synthesis processes also include adding a promoter, and the promoter specifically includes at least one of small-molecule organic alcohols, fluorine, nitrate, triethylamine, and diethylamine; and the small molecule organic alcohols specifically refer to organic compounds containing hydroxy group with a molecular weight less than 100, preferably methanol, ethanol, ethylene glycol, and isopropanol.

In the foregoing synthesis method, the OSDA is a structure-directing agent, which specifically includes at least one of N, N, N-trimethylamantadine, benzyltrimethylammonium, choline chloride, 1,6-hexanediamine, tetramethylammonium hydroxide, tetraethyl ammonium hydroxide, tetrapropylammonium hydroxide, and N, N-dimethylpiperidine hydroxide.

The pH value of the solution in the foregoing processes is greater than 10, and the strong alkaline environment promotes the opening of silicon-oxygen and aluminum-oxygen bonds in the raw materials and the orderly construction of the framework types of the product.

The temperature of foregoing stirring reaction is not more than 100° C., and stirring is performed until a well-mixed sol is formed.

The subsequent aging takes 5 h-100 h, to provide sufficient time for the construction of the precursor for framework types of molecular sieves, and to make the prepared molecular sieves have a more regular morphology and a more uniform structure.

In the subsequent crystallization reaction at a constant temperature, the crystallization is performed at a temperature selected from a range of 140° C.-220° C. for 6 h-240 h, preferably 160° C.-180° C. for 7 h-15 h. The crystallization functions to complete nucleation, growth, and maturation of msect-4 molecular sieve crystals.

In the processes of crystallization reaction at a constant temperature, the msect-4 molecular sieves prepared under the static condition have a large grain size, which reaches a micron level; and the msect-4 molecular sieves prepared under the stirring condition have a small grain size, which may reach a nano level.

Subsequently, drying and calcination are performed, and the calcination is performed at a temperature selected from a range of 450° C.-550° C. for 3 h-9 h; and the calcination is performed in an oxygen-rich atmosphere with an oxygen content more than 20%, to provide sufficient oxygen for thermal decomposition of the structure-directing agent.

The framework types of the synthesized msect-4 molecular sieves have at least two topologies of OFF and ERI simultaneously, and characteristic diffraction peak positions $2\theta$ of X-ray (in particular to K$\alpha$-ray) characterized by a crystal structure are 7.89±0.1°, 11.9±0.1°, 13.56±0.1°, 14.23±0.1°, 15.64±0.1°, 16.26±0.1°, 16.67±0.1°, 19.62±0.1°, 20.68±0.1°, 21.51±0.1°, 23.46±0.1°, 23.86±0.1°, 25.03±0.1°, 26.32±0.1°, 27.13±0.1°, 27.4±0.1°, 28.25±0.1°, 28.51±0.1°, 30.7±0.1°, 31.4±0.1°, 31.63±0.1°, 31.96±0.1°, 33.63±0.1°, 36.09±0.1°, 36.35±0.1°, 39.49±0.1°, 41.1±0.1°, 42.89±0.10, 43.27±0.1°, 43.65±0.1°, 45.88±0.1°, 46.53±0.1°, 48.43±0.1°, 49.181±0.1°, 49.86±0.1°, 50.67±0.1°, 51.72±0.1°, 52.52±0.1°, 54.03±0.1°, 55.73±0.1°, 56.37±0.1°, 58.34±0.1°, 59.64±0.1°, 61.23±0.1°, 61.77±0.1°, 63.7±0.1°, 65.3±0.1°, 65.72±0.1°, 66.61±0.1°, 67.97±0.1°, 68.79±0.1°, 70.43±0.1°, 70.72±0.1°, 72.38±0.1°, 74.7±0.1°, 75.321±0.1°, 76.8±0.1°, and 78.56±0.1°.

Further, by adjusting the ratio of the silicon source to the aluminum source, the silicon-aluminum ratio (Si/Al) of the synthesized msect-4 molecular sieves is selected from a range of 1-200, preferably 5-25.

In addition to the foregoing two synthesis methods, the preparation methods for the msect-4 molecular sieves further include template-free synthesis, that is, the OSDA is not added into the foregoing synthesis system, and the msect-4 molecular sieves with OFF and ERI topologies can be prepared after crystallization reaction at a constant temperature selected from a range of 160° C.-220° C. for 2-15 days.

For the ammonium exchange, the ammonium exchange solution is at least one of ammonium nitrate, ammonium chloride, ammonium carbonate, ammonium bicarbonate, and ammonium sulfate; the ammonium exchange reaction takes 1 h-24 h, preferably 6 h-10 h; and the ammonium exchange temperature is less than 120° C.

An msect-4 molecular sieve catalytic material involved in the present disclosure specifically refers to the composition with molecular sieves with OFF and ERI topologies as a carrier to carry active ingredient elements.

The active ingredient elements specifically refer to Cu, Fe, Co, Mo, Mn, La, Y, Ce, Sm, Pd, Pt, Rh, Au, Ag, Ru, Ni, Nb, Cr, Ag, Pr, Nd, and V, preferably Fe, Cu, Mn, Ce, Pd, and Mo.

Preparation methods for the msect-4 molecular sieve catalytic materials include impregnation, ion exchange, steam assisted exchange, atomic deposition, and solid-phase ion exchange.

The active ingredient elements account for 0.05%-35% of the catalytic materials by mass, preferably 2%-6%.

The catalytic materials prepared by copper, iron, and cobalt carried by the msect-4 molecular sieves may be used in selective catalytic reduction technology (Urea-SCR).

The catalytic material prepared by platinum, palladium, gold, and silver carried by the msect-4 molecular sieves may be used in passive nitrogen oxide adsorption technology (PNA).

The msect-4 molecular sieve catalytic materials may also be used in fluid catalytic cracking technology (FCC).

Compared with the prior art, the msect-4 molecular sieves with OFF and ERI topologies, the preparation method therefor, and the use thereof in the present disclosure have the following beneficial effects:

(1) The bone-like msect-4 molecular sieves with the stacking OFF and ERI topologies designed in the present disclosure are molecular sieve with intergrown phases of OFF and ERI topologies, which have excellent hydrothermal stability, a plurality of adsorption sites exposed by the regular bone-like structure, and a large specific surface area, are applicable to many technical fields such as SCR, PNA, and FCC, and have broad application prospects.

(2) The preparation method for the msect-4 molecular sieves provided in the present disclosure has an extremely short synthesis time, and the synthesis can be completed within 6 h, which reduces safety risks of the high-temperature crystallization process, and is suitable for industrial scale production.

(3) The msect-4 molecular sieve catalytic materials involved in the present disclosure have a low-temperature $NH_3$-SCR performance with $T_{50}=142°$ C., an active temperature window with T90 within a range of 175° C.-580° C., and a nitrogen selectivity of nearly 100%, exhibiting good low-temperature performance, wide temperature window, and high nitrogen selectivity.

DESCRIPTION OF THE ERIBODIMENTS

Unless otherwise defined, the technical terms used in the following examples have the same meanings as those commonly understood by a person skilled in the art to which the present disclosure belongs. Test reagents used in the following examples are all conventional biochemical reagents, unless otherwise specified; and the experimental methods are conventional methods, unless otherwise specified.

The present disclosure will be explained in detail below in conjunction with examples and the accompanying drawings.

In the present disclosure, a simulated flue gas used for $NH_3$-SCR performance test includes 500 ppm NO, 500 ppm $NH_3$, and 10% $O_2$, and $N_2$ is a balance gas, with a total flow rate of 1,000 ml/min and a reaction space velocity of 30,000 $h^{-1}$.

In the present disclosure, the low-temperature performance index $T_{50}$ represents a corresponding temperature when the $NO_x$ conversion rate reaches 50%; and the temperature window index $T_{90}$ represents a corresponding temperature range when the $NO_x$ conversion rate exceeds 90%.

Unless otherwise specified, all numerical values in the specification and claims of the present disclosure, such as temperature, time, and material contribution percentage by mass, should not be understood as absolute accurate values, but are within the error ranges understood by those of ordinary skill in the art and allowed by the common knowledge.

This patent will be further described below in conjunction with examples, but the protection scope of the present disclosure is not limited thereto.

Examples of msect-4 molecular sieve synthesis are Examples 1-5, and corresponding comparative examples are Comparative Examples 1-3.

Example 1

3.28 g of $NaAlO_2$ and 2 g of KOH are weighed separately and dissolved in 20 g of water, the solution is stirred for 1 h until the solution is clear, 20 g of N, N, N-trimethylamantadine is added, the stirring is continued for 2 h until the solution is well-mixed, and then a solution with pH>11.9 is obtained. Subsequently, 60 g of silica sol is added and the stirring is continued for 4 h to form a well-mixed sol. Aging is conducted for 10 h, followed by crystallization at a constant temperature of 160° C. for 8 h. Then, drying and calcination are performed at a constant temperature of 550° C. for 3 h. The prepared molecular sieve is labeled as K-msect-4. A 0.5 M solution of $NH_4NO_3$ is prepared, 5 g of the K-msect-4 molecular sieve and 500 ml of the solution are mixed with stirring for 12 h, and drying and calcination are performed after repeating the previous operation for three times, where the calcination is performed at a temperature of 550° C. for 3 h. The prepared molecular sieve is labeled as H-msect-4.

Figure 1:
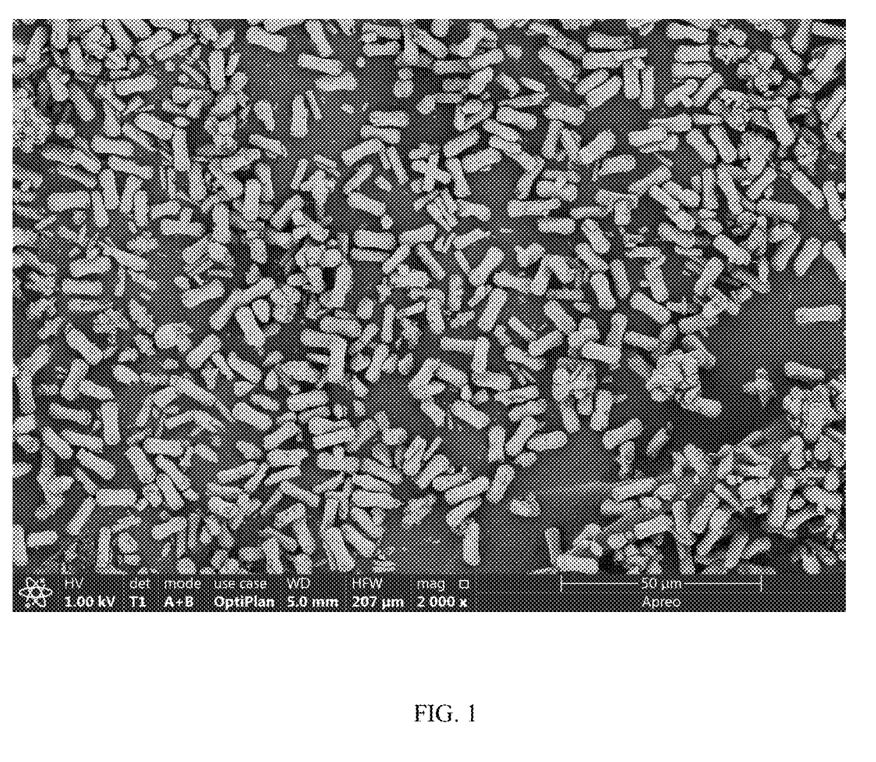
FIG. 1 is a photo of a micro morphology showing H-msect-4 molecular sieves with OFF and ERI topologies prepared in Example 1, presenting a regular bone-like structure with a magnification of 2,000×.
Figure 2:
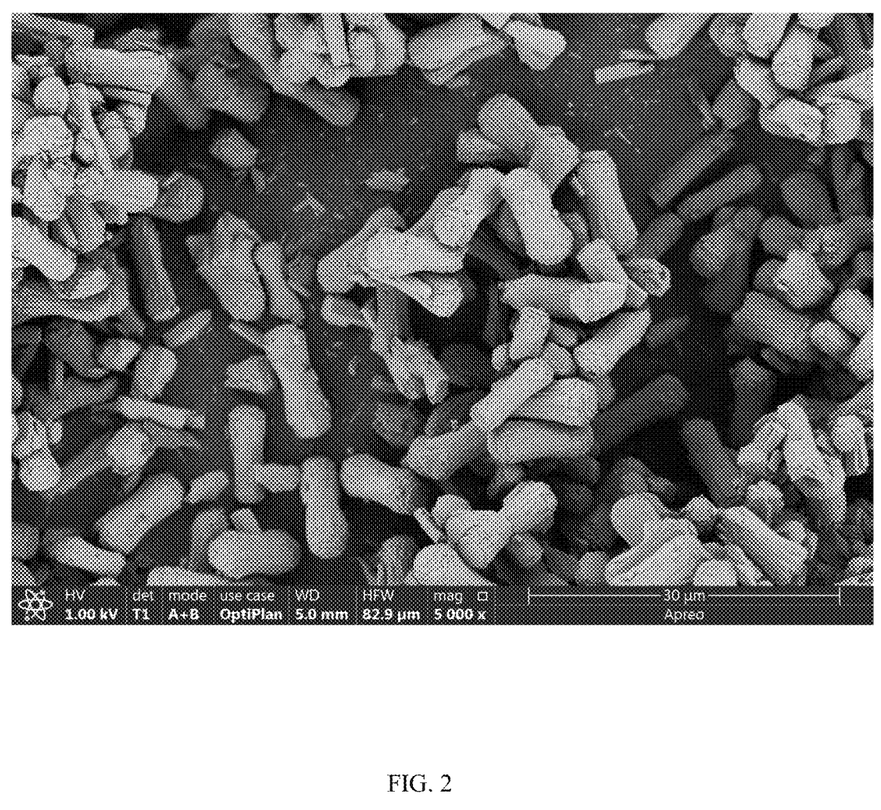
FIG. 2 is a photo of a micro morphology showing H-msect-4 molecular sieve products prepared in Example 1, with a magnification of 5,000×.

FIG. 1 and FIG. 2 are two photos of a micro morphology showing H-msect-4 molecular sieves with OFF and ERI topologies prepared in Example 1, presenting a regular bone-like structure.

Figure 3:
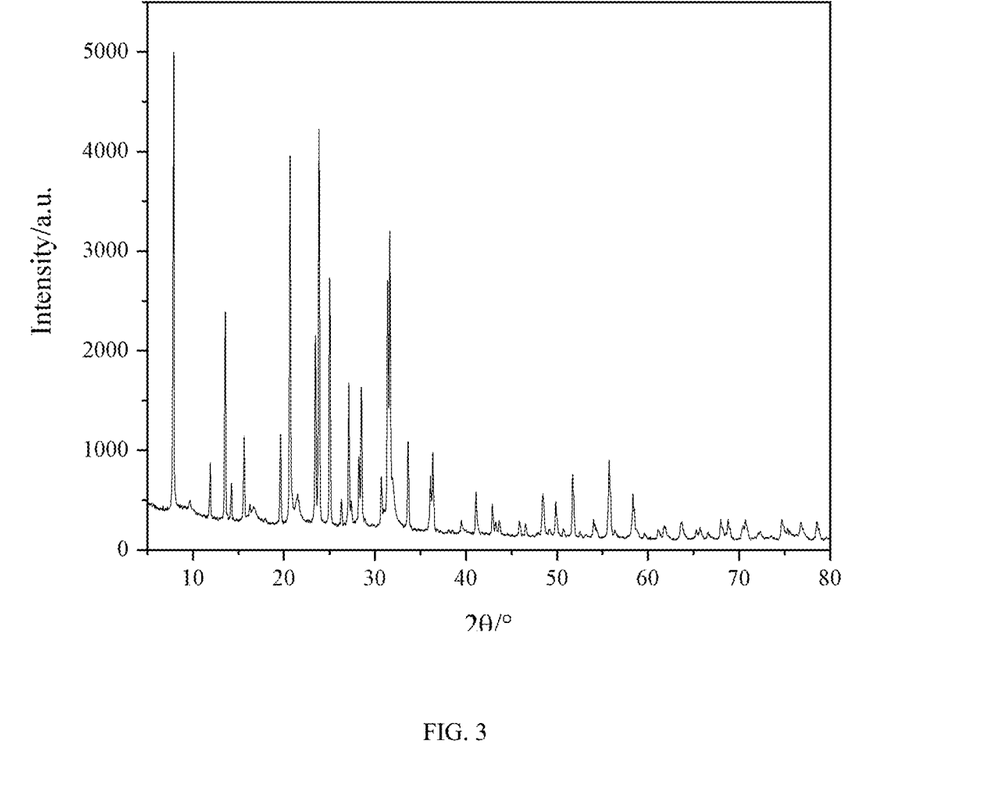
FIG. 3 is an X-Ray Diffraction (XRD) pattern showing H-msect-4 molecular sieve products prepared in Example 1, with characteristic diffraction peaks attributed to molecular sieves with OFF and ERI topologies.
Figure 4:
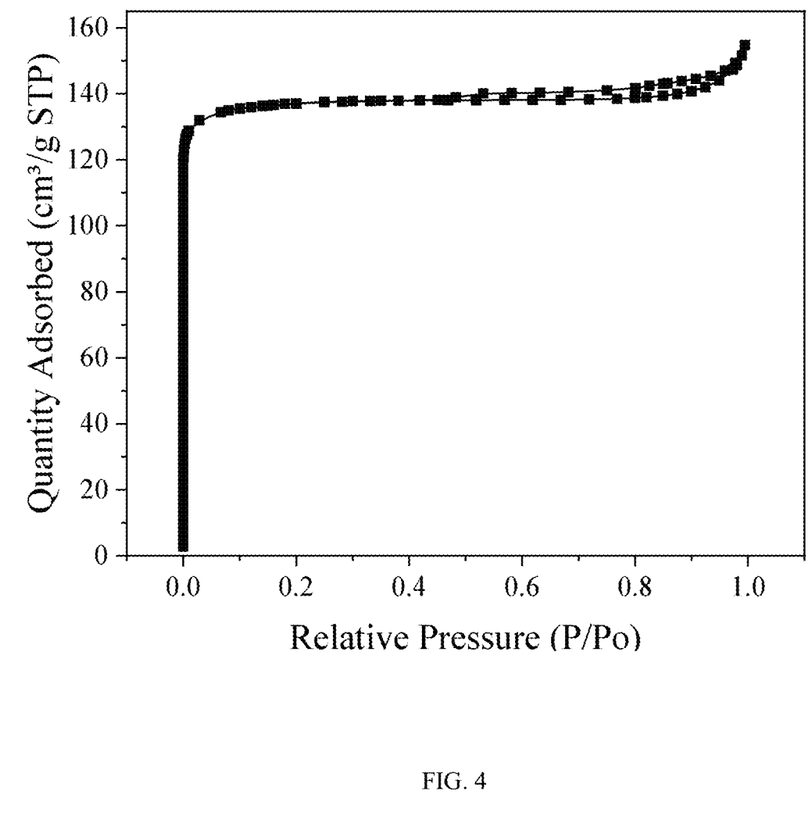
FIG. 4 shows a nitrogen adsorption-desorption isothermal curve of H-msect-4 molecular sieve products prepared in Example 1, where a microporous material can be judged through its hysteresis loop characteristics.

FIG. 3 is an XRD pattern showing H-msect-4 molecular sieve products prepared in Example 1, with characteristic diffraction peaks attributed to molecular sieves with OFF and ERI topologies. XRD characterization results show that the foregoing solid products have intergrown phases of ERI and OFF topologies; and Scanning Electron Microscope (SERI) characterization shows that the products exhibit a regular bone-like morphology. FIG. 4 shows a nitrogen adsorption-desorption isothermal curve of H-msect-4 molecular sieve products prepared in Example 1, wherei a microporous material can be judged through its hysteresis loop characteristics.

Example 2

Figure 5:
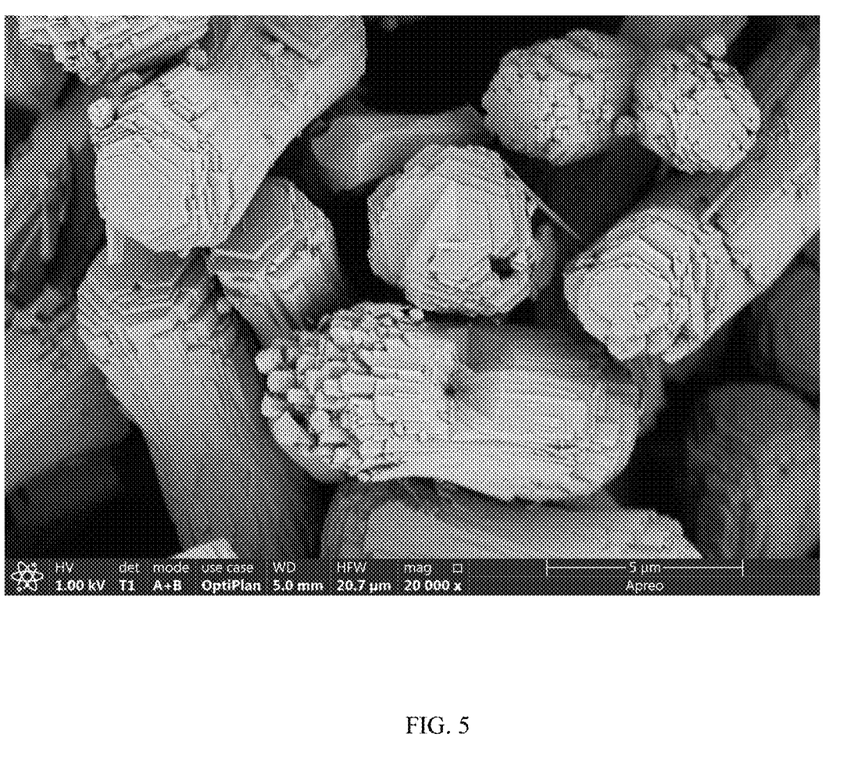
FIG. 5 is a photo of a micro morphology showing msect-4 molecular sieve products prepared in Example 2, where the morphology is formed by lamellar stacking, with a magnification of 20,000×.

The preparation conditions and preparation process of this example are the same as those of Example 1, except that a small amount of H-SSZ-13 molecular sieves is added into the well-mixed sol-gel as seed crystals. FIG. 5 is a photo of a micro morphology showing msect-4 molecular sieve products prepared in Example 2, where the morphology is formed by lamellar stacking.

Example 3

The preparation conditions and preparation process of this example are the same as those of Example 1, except that the OSDA is not added.

Figure 6:
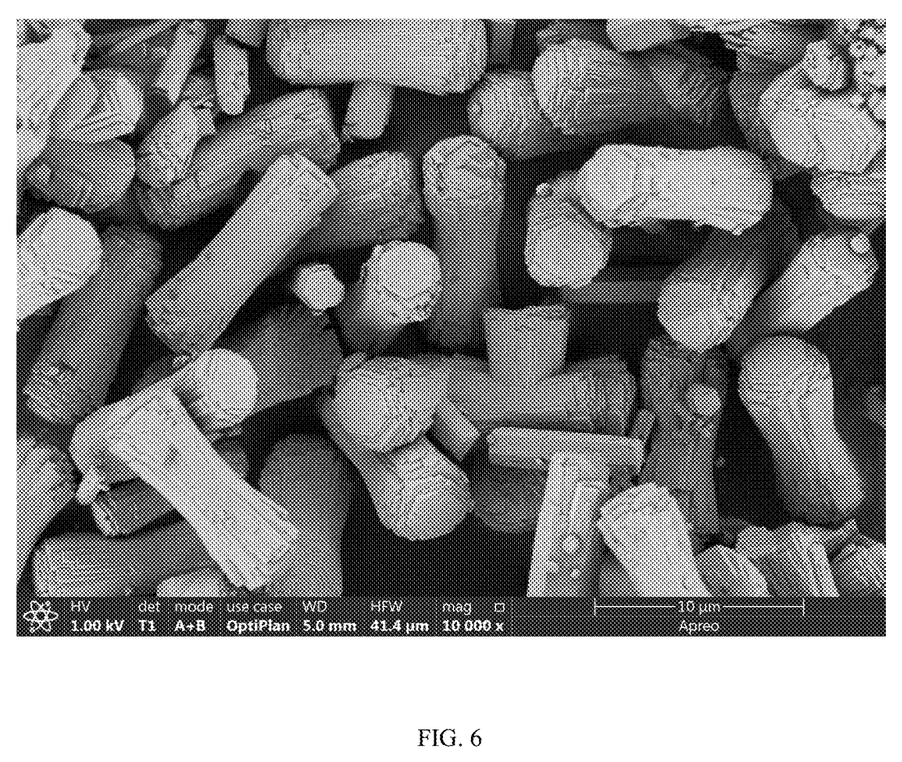
FIG. 6 is a photo of a micro morphology showing msect-4 molecular sieve products prepared in Example 3, where the two ends are thick and the middle is thin, with a magnification of 10,000×.

FIG. 6 is a photo of a micro morphology showing msect-4 molecular sieve products prepared in Example 3, where the two ends are thick and the middle is thin. SERI characterization shows that the product exhibits a regular bone-like morphology.

Example 4

5 g of H-SSZ-13, 2 g of KOH, and 20 g of $H_2O$ are weighed and added into 20 g of N, N, N-trimethylamantadine, then 10 g of silica sol with a solid content of 30% is added, and stirring is performed for 3 h until the solution is well-mixed, followed by putting it aside to age for 12 h. Crystallization reaction at a constant temperature of 160° C. for 8 h is performed. Subsequently, drying and calcination are performed, where the calcination is performed at a temperature of 550° C. for 6 h; and H-msect-4 molecular sieves are prepared.

Figure 7:
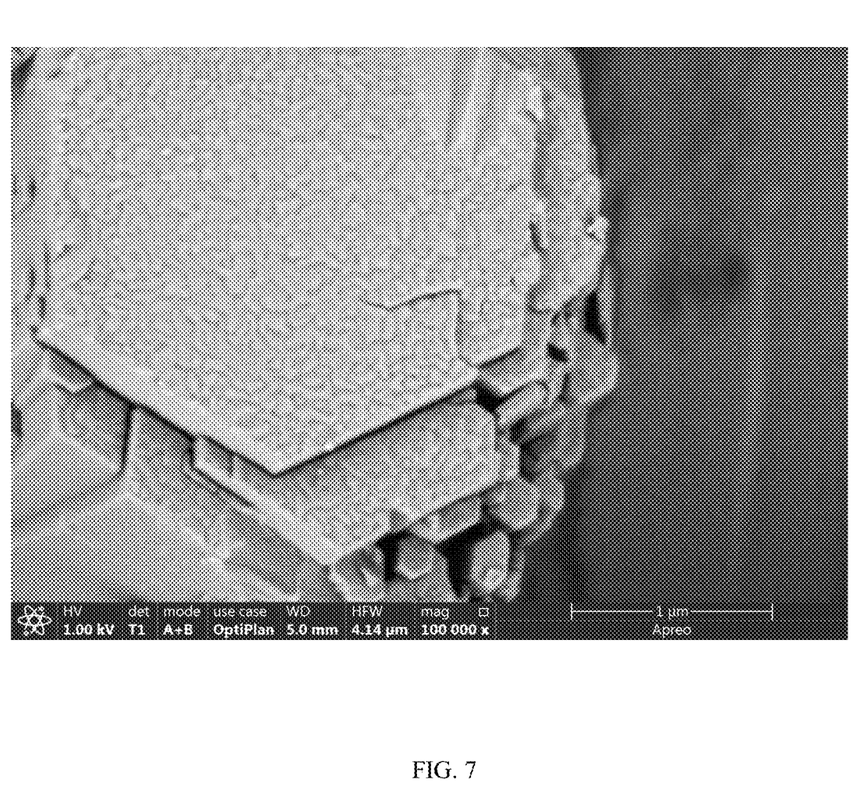
FIG. 7 is a photo of a micro morphology showing H-msect-4 molecular sieve products prepared in Example 4, where a flat end face and a hexagonal shape is shown, with a magnification of 100,000×.

FIG. 7 is a photo of a micro morphology showing msect-4 molecular sieve products prepared in Example 4, where a flat end face and a hexagonal shape is shown. SERI characterization shows that the product exhibits a regular bone-like morphology.

Example 5

The preparation conditions and preparation process of this example are the same as those of Example 4, except that the H-SSZ-13 molecular sieves are replaced with Y-type molecular sieves.

Comparative Example 1

Refer to the preparation conditions and preparation process of H-msect-4 molecular sieve preparation in Example 1. The difference is that the pH value of the solution is adjusted to be less than 10 with KOH.

Experimental results indicate that the products are mainly amorphous $SiO_2$.

Comparative Example 2

Refer to the preparation conditions and preparation process of H-msect-4 molecular sieve preparation in Example 1. The difference is that crystallization reaction at a constant temperature takes 4 h.

Experimental results indicate that the products are mainly amorphous $SiO_2$.

Comparative Example 3

Refer to the preparation conditions and preparation process of H-msect-4 molecular sieve preparation in Example 1. The difference is that the crystallization is performed at a constant temperature of 100° C.

Experimental results indicate that the products are mainly amorphous $SiO_2$.

Msect-4 molecular sieve catalysts prepared from Example 1 The catalysts are prepared by using an ion exchange method. 0.5 M solution of $Fe(NO_3)_3$, 0.5 M solution of $Cu(NO_3)_2$, 0.5 M solution of $Mn(NO_3)_2$, 0.5 M solution of $(NH_4)_2MoO_4$, and 0.5 M solution of $(NH_4)_6W_7O_{24}$ are prepared separately, 1 g of the H-msect-4 is added into 200 ml of each solution, and the solutions are heated at 80° C. for 12 h with stirring, followed by drying and calcination at a constant temperature of 550° C. for 3 h. The prepared catalysts are labeled as Fe/msect-4, Cu/msect-4, Mn/msect-4, Mo/msect-4, and W/msect-4, respectively.

Msect-4 molecular sieve catalysts prepared from Example 2 The catalysts are prepared by using an ion exchange method. 0.9 g of $Fe(NO_3)_3 \cdot 9H_2O$, 0.47 g of $Cu(NO_3)_2 \cdot 3H_2O$, 1.63 g of $Mn(NO_3)_2$, 0.18 g of $(NH_4)_2MoO_4 \cdot 6H_2O$, and 3.68 g of $(NH_4)_6W_7O_{24} \cdot 6H_2O$ are weighed separately, 1 g of the H-msect-4 is mixed with each of the metal sources, deionized water is added dropwise until the solution is viscous, and the solution is heated at 50° C. for ultrasound for 2 h, followed by drying and calcination at a constant temperature of 550° C. for 3 h. The prepared catalysts are labeled as Fe/msect-4-2, Cu/msect-4-2, Mn/msect-4-2, Mo/msect-4-2, and W/msect-4-2, respectively.

Msect-4 molecular sieve catalyst prepared from Example 3 Refer to the preparation conditions and preparation process of msect-4 molecular sieve catalyst in Example 2. The difference is that 0.9 g of $Fe(NO_3)_3 \cdot 9H_2O$ and 0.47 g of $Cu(NO_3)_2 \cdot 3H_2O$ are added simultaneously to obtain a catalyst labeled as Cu—Fe/msect-4-2.

Msect-4 molecular sieve catalyst prepared from Example 4 0.9 g of $Fe(NO_3)_3 \cdot 9H_2O$, 0.47 g of $Cu(NO_3)_2 \cdot 3H_2O$, 1.63 g of $Mn(NO_3)_2$, 0.18 g of $(NH_4)_2MoO_4 \cdot 6H_2O$, and 3.68 g of $(NH_4)_6W_7O_{24} \cdot 6H_2O$ are weighed separately, each of the metal sources is dissolved in 500 ml of deionized water to obtain a solution of metal sources, and 1 g of the H-msect-4 is mixed with the solution, followed by rotary evaporation at 70° C., drying and calcination at a constant temperature of 550° C. for 3 h. The prepared catalysts are labeled as Fe/msect-4-3, Cu/msect-4-3, Mn/msect-4-3, Mo/msect-4-3, and W/msect-4-3, respectively.

Msect-4 molecular sieve catalyst prepared from Example 5 2.5 g of $Pd(NO_3)_2$, 2.5 g of $Pt(NO_3)_2$, and 2.5 g of $Rh(NO_3)3$ are weighed separately, 5 g of the H-msect-4 is mixed with each of the metal sources, and deionized water is added dropwise until the solution is viscous, followed by ultrasound for 2 h, drying and calcination at a constant temperature of 550° C. for 3 h. The prepared catalysts are labeled as Pt-msect-4, Pd-msect-4, and Rh-msect-4, respectively.

CATALYTIC PERFORMANCE VERIFICATION EXAMPLE

Figure 8:
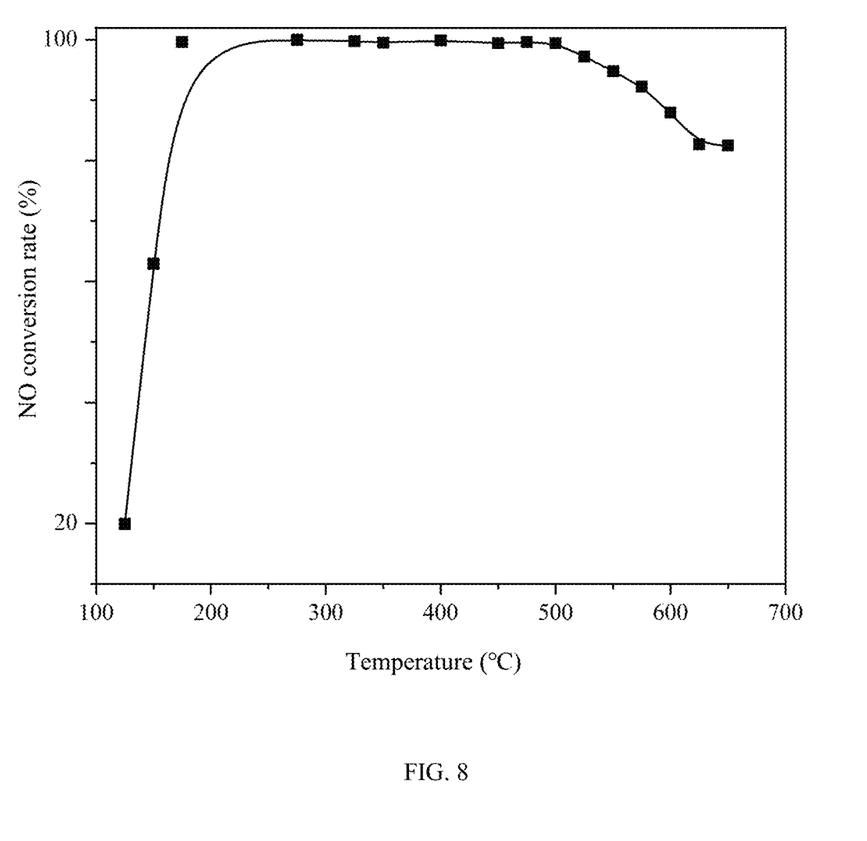
FIG. 8 shows a $NO_x$ conversion rate curve in a catalytic performance verification example, where a nitrogen oxide ignition temperature ($T_{50}$) is 142° C., an active temperature window ($T_{90}$) is 170° C.-580° C., and test conditions are $[NH_3]=[NO]=500$ ppm, $[O_2]=10$ vol. %, with $N_2$ as a balance gas, a total flow rate of 1,000 ml/min, and a space velocity of 30,000 $h^{-1}$.
Figure 9:
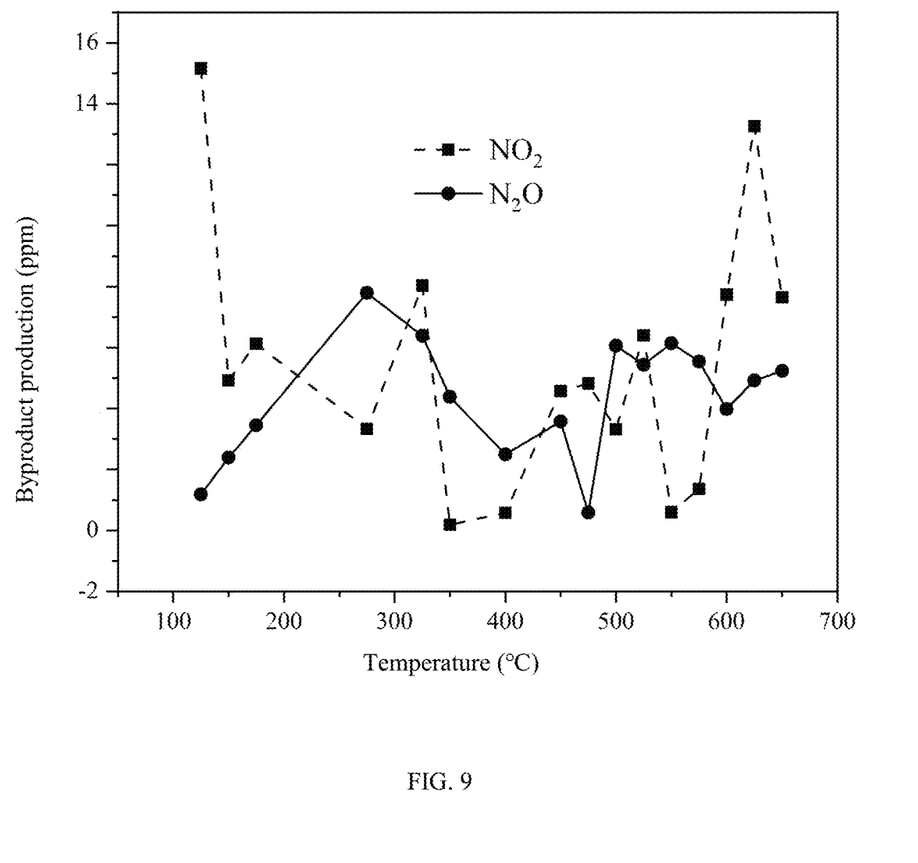
FIG. 9 shows byproduct production curves in a catalytic performance verification example, where the production of $N_2O$ is less than 10 ppm and the production of $NO_2$ at high temperatures is less than 15 ppm.

The catalyst sample Cu/msect-4 of the H-msect-4 molecular sieve catalysts prepared in Example 1 is pressed and sieved to prepare a 40-60 mesh solid to-be-tested sample. $NH_3$-SCR reaction performance is tested on an activity evaluation device by using simulated exhaust gas. A quartz reaction tube with a size of 15 mm is used, and a heating rate of 5° C./min is applied in the evaluation test. The simulated gas includes 500 ppm NO, 500 ppm $NH_3$, and 10% $O_2$, and $N_2$ is a balance gas, with a total flow rate of 1,000 ml/min and a reaction space velocity of 30,000 $h^{-1}$. The test results are shown in FIG. 8. FIG. 9 shows byproduct production curves in the catalytic performance verification example, where the production of $N_{20}$ is less than 10 ppm and the production of $NO_2$ at high temperatures is less than 15 ppm.

Figure 10:
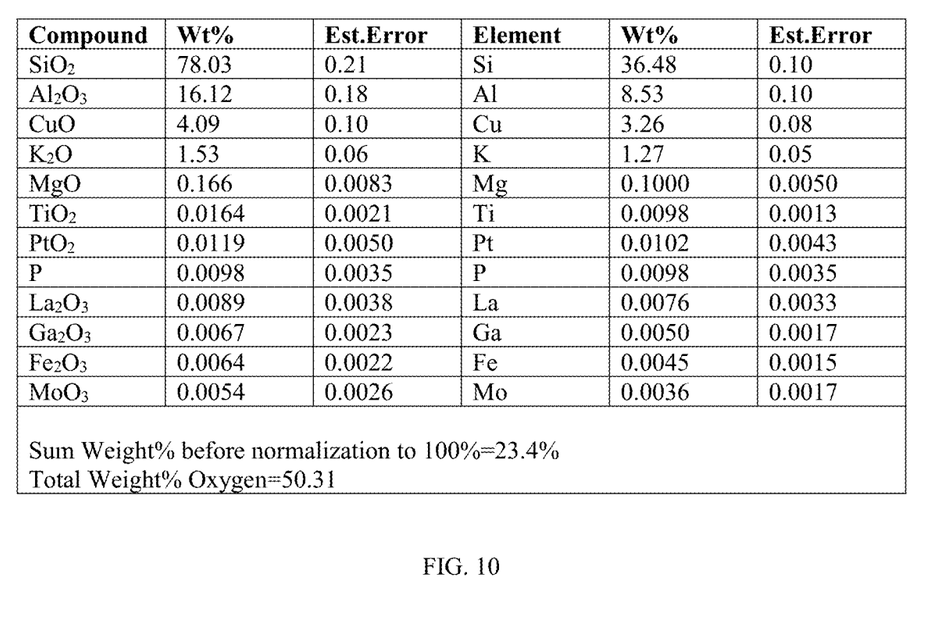
FIG. 10 shows elements in a catalytic performance verification example, with a copper content of 3.26 wt %.

FIG. 10 shows elements in the catalytic performance verification example, with a copper content of 3.26 wt %.

The test results show that the foregoing catalysts have a $NO_x$ ignition temperature $T_{50}$ of 142° C. and an active temperature window $T_{90}$ of 175° C.-580° C.

The above descriptions are only preferred examples of the present disclosure, and are not intended to limit the present disclosure. Any modification, equivalent replacement, improvement, and the like made within the spirit and principle of the present disclosure is included in the protection scope of the present disclosure.

What is claimed is:

1. A method for preparing msect-4 molecular sieves with OFF and ERI topologies, wherein the msect-4 molecular sieves with OFF and ERI topologies are intergrown, and the msect-4 molecular sieves exhibit a regular bone-like morphology;

the method comprises the following steps:
dispersing an eight-membered ring small pore molecular sieve used as a raw material in an aqueous phase with stirring, adding caustic potash, adjusting pH to be greater than 10, adding an Organic Structure-Directing Agent (OSDA), and adding a silicon source to adjust a silicon-aluminum ratio, followed by shear stirring, aging, crystallization reaction, filtration, washing, ammonia exchange reaction, drying, and calcination;
main X-ray characteristic diffraction peak positions 2θ of the msect-4 molecular sieve are 7.89±0.1°, 11.9±0.1°, 13.56±0.1°, 14.23±0.1°, 15.64±0.1°, 16.26±0.1°, 16.67±0.1°, 19.62±0.1°, 20.68±0.1°, 21.51±0.1°, 23.46±0.1°, 23.86±0.1°, 25.03±0.1°, 26.32±0.1°, 27.13±0.1°, 27.4±0.1°, 28.25±0.1°, 28.51±0.1°, 30.7±0.1°, 31.4±0.1°, 31.63±0.1°, 31.96±0.1°, 33.63±0.1°, 36.09±0.1°, 36.35±0.1°, 39.49±0.1°, 41.1±0.1°, 42.89±0.1°, 43.27±0.1°, 43.65±0.1°, 45.88±0.1°, 46.53±0.1°, 48.43±0.1°, 49.181±0.1°, 49.86±0.1°, 50.67±0.1°, 51.72±0.1°, 52.52±0.1°, 54.03±0.1°, 55.73±0.1°, 56.37±0.1°, 58.34±0.1°, 59.64±0.1°, 61.23±0.1°, 61.77±0.1°, 63.7±0.1°, 65.3±0.1°, 65.72±0.1°, 66.61±0.1°, 67.97±0.1°, 68.79±0.1°, 70.43±0.1°, 70.72±0.1°, 72.38±0.1°, 74.7±0.1°, 75.321±0.1°, 76.8±0.1°, and 78.56±0.1°; and the msect-4 molecular sieves have at least two framework types of OFF and ERI, with a silicon-aluminum atomic molar ratio range of 1-200.

2. The method according to claim 1, wherein the eight-membered ring small pore molecular sieve comprises one or more molecular sieves with an AEI, AFX, CHA, DDR, EEI, ESV, ERI, LEV, LTN, LTA, KFI, RHO, RTH, SAS, or SFW topology;

the silicon source is one or more of sodium silicate, silica sol, fumed silica, coal gangue, metasilicic acid, potassium silicate, and ethyl orthosilicate; and the OSDA is at least one of N, N, N-trimethylamantadine, benzyltrimethylammonium, choline chloride, 1,6-hexanediamine, tetramethylammonium hydroxide, tetraethyl ammonium hydroxide, tetrapropylammonium hydroxide, and N, N-dimethylpiperidine hydroxide.

3. The method according to claim 1, wherein an ammonium exchange solution in the ammonia exchange reaction is at least one of ammonium nitrate, ammonium chloride, ammonium carbonate, ammonium bicarbonate, and ammonium sulfate;

an ammonium exchange reaction time is 1 h-24 h, and an ammonium exchange temperature is less than 120° C.

4. The method according to claim 1, wherein a molar ratio of the raw materials $Al_2O_3$: $SiO_2$: $OSDA:K_2O:H_2O=1$: (5-50): (1-10): (0.5-10): (60-200);

a stirring reaction temperature is not more than 100° C.; an aging time is 5 h-100 h;
the crystallization is conducted at a constant temperature selected from a range of 140° C.-220° C. for 6 h-240 h; and
the calcination is conducted at a constant temperature selected from a range of 450° C.-550° C. for 3 h-9 h; and oxygen content in the calcination atmosphere is more than 20%.

5. The method according to claim 1, wherein a promoter is further added in the process of adding the caustic potash, the aluminum source, and the OSDA; the promoter specifically comprises at least one of a small molecule organic alcohol, a fluorine element, nitrate, triethylamine, and diethylamine; and the small molecule organic alcohol is one of methanol, ethanol, ethylene glycol, and isopropanol.

* * * * *